April 26, 1927. 1,626,340
G. D. HOWITH
CONVERTIBLE VEHICLE SEAT
Filed June 15, 1925 2 Sheets-Sheet 1
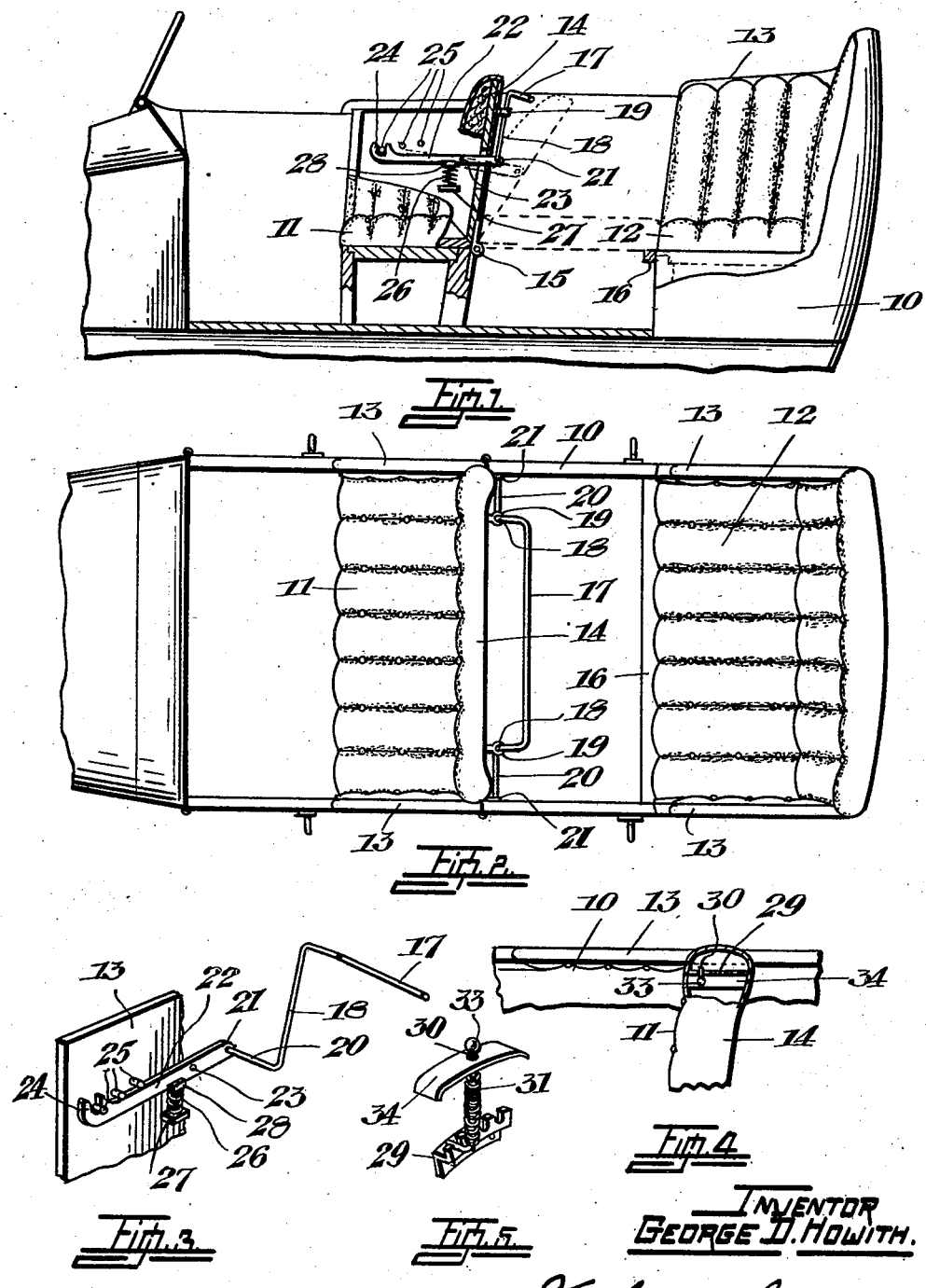
INVENTOR
GEORGE D. HOWITH.

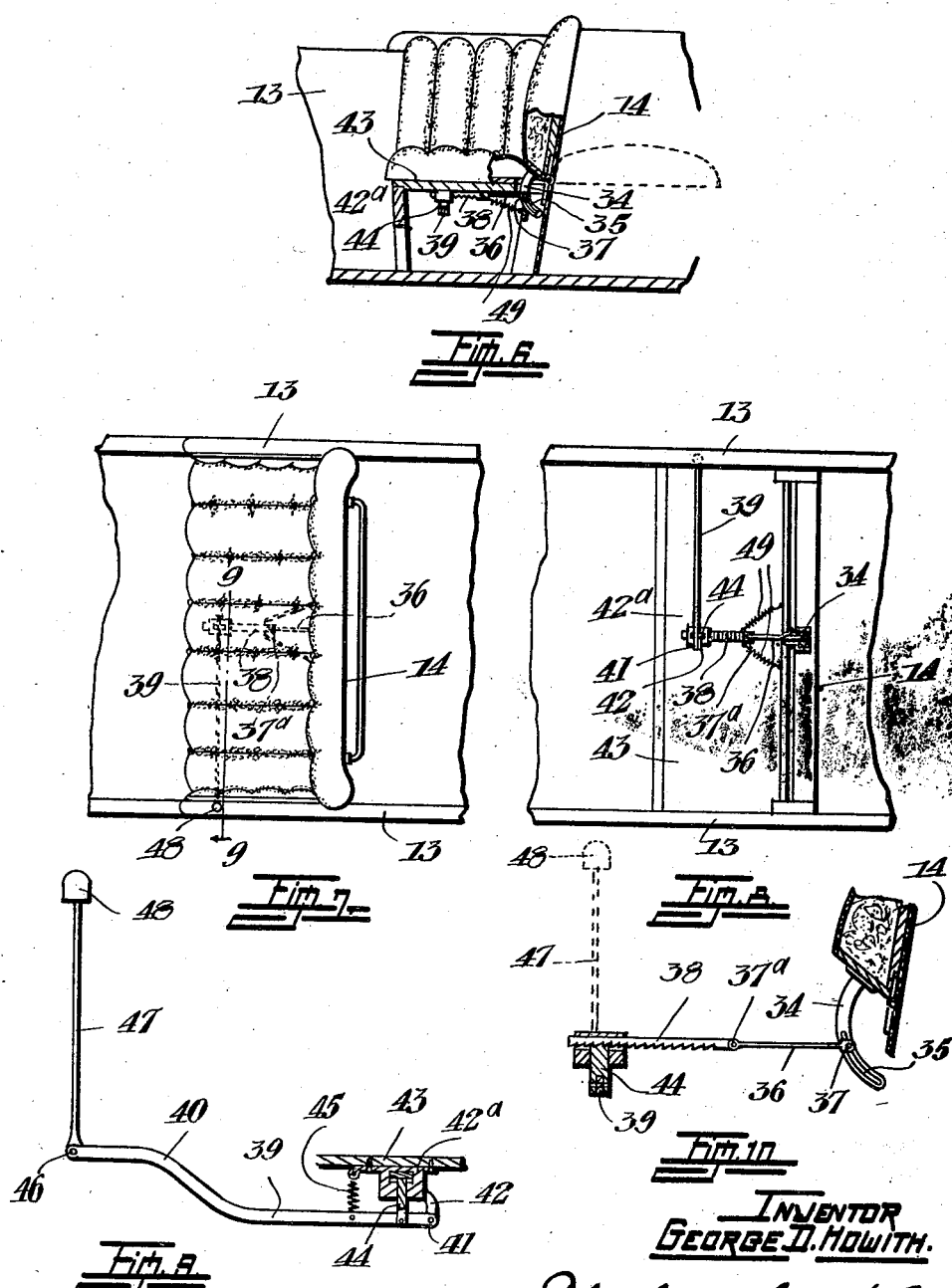

Patented Apr. 26, 1927.

1,626,340

UNITED STATES PATENT OFFICE.

GEORGE DRYSDALE HOWITH, OF OTTAWA, ONTARIO, CANADA.

CONVERTIBLE VEHICLE SEAT.

Application filed June 15, 1925. Serial No. 37,265.

This invention relates to improvements in convertible vehicle seats and the objects of the invention are to provide a convertible vehicle seat for automobiles and the like adapted to convert the vehicle into a bed or couch.

Further objects are the provision of a seat of this description in which the back can be adjusted to any required angle and retained in adjusted position automatically.

A still further object is the provision of a hinged back to the front seat which may be lowered by exerting pressure on the rug rail to any required angle to form an inclining seat or a couch and which can be automatically retained in adjusted position.

A still further object is the provision of a device of this character whereby an automobile may be quickly and comfortably converted into a couch or bed and in connection with which the construction is so simplified and improved that the several parts will more satisfactorily perform the various functions allotted to them.

With these and several other objects in view, as will be apparent from the description, the invention consists essentially of a front seat with a hinged back, means operable by the rug-rail on the seat for swinging it backward to any required position, spring-actuated means in combination with the side of the vehicle and operable by the rug rail for normally retaining the seat in adjusted position and whereby the seat is released to be adjusted to a required position.

Referring now to the drawings in which like characters of reference indicate corresponding parts in each figure, Figure 1 is a side elevation of an automobile body, partly in section, showing the front seat equipped with my convertible means, Figure 2 is a top plan view of the vehicle body, Figure 3 is a perspective detail of the mechanism, operable by the rug rail, for retaining the hinged back of the seat in adjusted position, Figure 4 is a detail, plan view of a modified form of the seat converting means, and Figure 5 is a perspective detail of the seat releasing member.

Figure 6 is a side elevation, partly in section, of push-button operated mechanism for converting the seat, Figure 7 is a top plan view, Figure 8 is an underside view, Figure 9 is a section on line 9—9 of Figure 7, and Figure 10 is a detail of the push-button mechanism.

Referring now more particularly to the drawings, the reference numeral 10 designates the body of a motor vehicle as a whole. The vehicle is provided with a front seat 11 and a rear seat 12, within the sides 13, in any well known manner. In ordinary construction the back 14 of the front seat is rigid but in my improved means for adjusting the back seat to any required angle, thus converting the vehicle into a bed or glorified Morris-chair, this seat is hinged at the bottom at 15 whereby it is designed, as indicated by the dotted lines in Figure 1, to swing backwardly to any required angle and to a horizontal position to be supported by a cross bar 16 on the back seat to form, with said seat, a comfortable bed or couch.

To thus convert an ordinarily equipped motor car to a motor couch or the like the hinged back 14 of the front seat 11 is designed to be retained automatically in normal, vertical position or in adjusted position, the mechanism for this purpose being connected to and operable by the rug rail 17 suitably bent and formed with an extension 18 at each end adapted to slidably engage with the retaining members 19 rigidly secured in the back 14. The extension 18, formed on each end of the rug rail 17, is further bent at right angles at 20 to engage with the end 21 of a latch arm 22 pivotally mounted at 23 on the sides 13 and recessed at its other end at 24 to engage with each of a series of retaining pins 25 protruding partially from the sides 13. This latch arm 22 is automatically retained in engaging position by means of a coil spring 26 mounted on a bracket 27 supported on the side of the vehicle, a cup-shaped member 28 being provided on the top of the spring to engage with the latch arm.

It will thus be seen, on pressure being exerted on the bar 17 by the weight of the rugs, wraps or the like, that, in addition to the latch arm 22 being normally and automatically retained in engagement with one of the pins 25 by the spring 26, the end 21 will be pressed downwardly by the weight on the bar 17 causing the recessed end 24 to more securely engage in turn each of said pins 25.

On the other hand, when it is desired to release the latch bar 22 from engagement with the pins 25 and thus permit the back 14 of the front seat to swing to any required angle, it is only necessary to exert upward pressure or, in other words, move the rug rail upwardly in the retaining members 19 on the back of the seat when the end 24 of the latch bar will be automatically released from engagement with one of the pins 25 permitting the seat 14, as above mentioned, to swing outwardly to any required position up to the horizontal, its travel at this point being stopped by the supporting block member 16.

From the foregoing the simplicity and efficiency of my improved construction, obviating all disfiguration which might mar the appearance of the vehicle, and at the same time providing something simpler and more satisfactory in inventions of this kind by utilizing the rug rail to operate the seat adjusting or converting mechanism, will be apparent. It will be found to give most satisfactory results.

In Figures 4 and 5 I have illustrated a modified form of my invention which consists in securing a quadrant member 29 to the side of the vehicle and inserting in the hinged back 14, at the top, a latch bolt 30 provided with a coil spring 31 adapted to engage individually with the teeth in the quadrant and provided at the top with an operating knob or handle 33 extending through a plate 34 in the top of the seat whereby, on it being desired to adjust the seat, as indicated in dotted lines in Figure 1, to any required angle, the bolt 33 is pulled upwardly out of engagement with the quadrant and so held until the adjusted position of the seat is attained when it is let go to automatically engage with one of the serrations and thus automatically and normally retain the seat in adjusted position.

The latch bolt 30 can also be spring-actuated to disengage the means for retaining the back of the seat in adjusted position by pressure.

In Figures 6 to 10, inclusive, is illustrated a very popular form of my invention embracing all the advantages of a Morris-chair in addition to that of converting a seat into a couch. This form of my invention, which is of durable construction, efficient and economical to operate, enables the back of the seat to be released by operating a push-button in the side of the vehicle thereby allowing the back to be swung backwardly or forwardly to any required position from the vertical to the horizontal and to be retained automatically in that position.

This mechanism comprises an arcuate plate 34 rigidly secured in the back 14 of the seat and provided with a slot 35. This arcuate member 34 is designed to slidably engage with a link 36 and to be retained in engagement therewith by means of a pin 37 through the end of said link and designed to engage with the slot 35 in the arcuate member whereby sufficient play is allowed for the link 36, the other end of which is connected at 37ª to a rack member 38. At right angles to the rack member 38 is a lever arm 39 suitably bent at 40 and pivotally connected at 41, at its inner end, to a bracket 42 in turn rigidly connected to the bottom 42ª of the seat body 43. Mounted on this arm, adjacent the inner end is a toothed member 44 adapted to engage with a rack 38 and normally retained in engagement therewith by means of a coil spring 45 connecting the arm 39 with the underside of the seat. Loosely connected at 46 to the outer end of the arm 39 is a push-rod 47 extending vertically through the side of the vehicle and provided, at its upper end, with a push-button 48 whereby pressure is exerted on the rod to in turn operate the arm 39 to cause the engaging member or toothed pin 44 to disengage with the rack 38 permitting, on pressure being exerted through the button 48 and by the release of the member 44 from engagement with the rack 38, the back 14 of the seat to be swung outwardly, the rack 38 and link 36 travelling on the arcuate member 34 to move therewith outwardly, as indicated by the dotted lines in Figure 6. When, on the required position of the back of the seat being reached, the push-button is released, the member 44 automatically through the action of the spring 45 re-engages with the rack 38.

To move the seat inwardly, to a position as indicated in Figure 6, it is only necessary to press the push-button 48 when it will automatically assume a vertical position through the spring 49. The movement of the seat outwardly is practically automatic as, when the occupant of the seat presses the button, the pressure exerted on the back of the seat is sufficient to permit the latter to swing accordingly.

Another feature of my invention is that if, in the different makes of automobiles to which it is applicable, the space between the front and the rear seats does not conveniently allow for the engagement of the back 14 in a horizontal position, forming a couch, with the block 16 on the rear seat, the improved rug rail 17 may be utilized as a support therefor.

As many changes could be made in the above construction and many apparently widely different embodiments of my invention, within the scope of the claim, constructed without departing from the spirit and scope thereof, it is intended that all matter contained in the accompanying specification and drawings shall be interpreted in an illustrative and not in a limiting sense.

What I claim as my invention is:

A convertible vehicle seat for automobiles and the like comprising a hingedly mounted back, vertically extending rods spaced from and slidably mounted on said back, a cross-rod integral with the vertical rods and adapted to form a rug rail, right angled extensions formed on the vertical rods, a series of spaced pins arranged in the side walls of the vehicle, a latch arm pivotally mounted on each side of the seat and connected at one end to said extensions, the unconnected end of said arm being formed with teeth to individually engage with said pins, a bracket on the side of the seat and a coil spring positioned on said bracket and adapted to engage with the latch arm to normally retain it in locked position, whereby, on the cross-rod being pulled upwardly the latch arm is automatically disengaged or unlocked.

In witness whereof I have hereunto set my hand.

GEORGE DRYSDALE HOWITH.